(12) United States Patent
Fujimoto et al.

(10) Patent No.: US 8,611,393 B2
(45) Date of Patent: Dec. 17, 2013

(54) LASER APPARATUS

(75) Inventors: Junichi Fujimoto, Oyama (JP);
Takahito Kumazaki, Oyama (JP); Toru Suzuki, Oyama (JP); Satoshi Tanaka, Oyama (JP); Osamu Wakabayashi, Hiratsuka (JP)

(73) Assignee: Gigaphoton Inc., Oyama-shi (JP)

( * ) Notice: Subject to any disclaimer, the term of this patent is extended or adjusted under 35 U.S.C. 154(b) by 0 days.

(21) Appl. No.: 13/421,116

(22) Filed: Mar. 15, 2012

(65) Prior Publication Data

US 2012/0236884 A1 Sep. 20, 2012

Related U.S. Application Data

(63) Continuation of application No. PCT/JP2011/055359, filed on Mar. 8, 2011.

(30) Foreign Application Priority Data

Mar. 23, 2010 (JP) ................... 2010-066594
Oct. 25, 2010 (JP) ................... 2010-238936

(51) Int. Cl.
*H01S 3/08* (2006.01)

(52) U.S. Cl.
USPC ............ 372/100; 372/102; 372/101; 372/98; 372/57; 372/55

(58) Field of Classification Search
USPC ................. 372/102, 101, 100, 98, 57, 55
See application file for complete search history.

(56) References Cited

U.S. PATENT DOCUMENTS

| | | | |
|---|---|---|---|
| 4,862,467 A | 8/1989 | Carter et al. |
| 5,450,434 A | 9/1995 | Ota et al. |
| 6,393,037 B1 | 5/2002 | Basting et al. |
| 6,526,086 B1 | 2/2003 | Wakabayashi et al. |
| 6,671,294 B2 | 12/2003 | Kroyan et al. |
| 6,721,340 B1 | 4/2004 | Fomenkov et al. |
| 6,853,653 B2 | 2/2005 | Spangler et al. |
| 6,856,638 B2 | 2/2005 | Aab et al. |
| 7,079,556 B2 | 7/2006 | Fomenkov et al. |
| 7,088,758 B2 | 8/2006 | Sandstrom et al. |
| 7,139,301 B2 | 11/2006 | Kroyan et al. |
| 7,154,928 B2 | 12/2006 | Sandstrom et al. |

(Continued)

FOREIGN PATENT DOCUMENTS

| | | |
|---|---|---|
| JP | 02-098919 | 4/1990 |
| JP | 04-167419 | 6/1992 |

(Continued)

*Primary Examiner* — Kinam Park
(74) *Attorney, Agent, or Firm* — Hogan Lovells US LLP

(57) ABSTRACT

This disclosure is directed to widen an adjustable range of the spectral linewidth of laser light output from a laser apparatus. This laser apparatus may include: (1) an excitation source configured to excite a laser medium in a laser gain space, (2) an optical resonator including an output coupler arranged on one side of an optical path through the laser gain space and a wavelength dispersion element arranged on the other side of the optical path through the laser gain space, and (3) a switching mechanism configured to switch a beam-width magnification or reduction factor by placing or removing at least one beam-width change optical system for expanding or reducing a beam width in or from an optical path between the laser gain space and the wavelength dispersion element or by inverting orientation of the at least one beam-width change optical system in the optical path.

20 Claims, 21 Drawing Sheets

(56) References Cited

U.S. PATENT DOCUMENTS

| | | |
|---|---|---|
| 7,298,770 B2 | 11/2007 | Spangler et al. |
| 7,382,815 B2 | 6/2008 | Spangler et al. |
| 7,756,183 B2 | 7/2010 | Wakabayashi et al. |
| 7,899,095 B2 | 3/2011 | Partlo |
| 2007/0064240 A1* | 3/2007 | Hill ............................. 356/487 |
| 2008/0181262 A1* | 7/2008 | Wakabayashi et al. ............ 372/9 |
| 2008/0285602 A1* | 11/2008 | Nagai et al. ..................... 372/20 |

FOREIGN PATENT DOCUMENTS

| | | |
|---|---|---|
| JP | 05-235453 | 9/1993 |
| JP | 10-065254 | 3/1998 |
| JP | 11-274632 | 10/1999 |
| JP | 2000-150998 | 5/2000 |
| JP | 2002-094160 | 3/2002 |
| JP | 2002-232045 | 8/2002 |
| JP | 2005-123330 | 5/2005 |

\* cited by examiner

US 8,611,393 B2

LASER APPARATUS

CROSS-REFERENCE TO RELATED APPLICATIONS

The present application is a continuation of International Application PCT/JP2011/055359, with an international filing date of Mar. 8, 2011, which claims priority from Japanese Patent Application No. 2010-066594 filed Mar. 22, 2010, and Japanese Patent Application No. 2010-238936 filed Oct. 25, 2010.

BACKGROUND

1. Technical Field

This disclosure relates to a laser apparatus for outputting laser light.

2. Related Art

The spectral linewidth of laser light output from a laser apparatus is narrowed by a wavelength dispersion element disposed in the optical path of the laser apparatus. Line narrowing of laser light is performed, for example, to reduce chromatic aberration in optical systems of a semiconductor exposure apparatus in which laser light output from a laser apparatus is used.

SUMMARY

A laser apparatus according to one aspect of this disclosure may include: (1) an excitation source configured to excite a laser medium in a laser gain space, (2) an optical resonator including an output coupler arranged on one side of an optical path through the laser gain space and a wavelength dispersion element arranged on the other side of the optical path through the laser gain space, and (3) a switching mechanism configured to switch a beam-width magnification or reduction factor by placing or removing at least one beam-width change optical system for expanding or reducing a beam width in or from an optical path between the laser gain space and the wavelength dispersion element or by inverting orientation of the at least one beam-width change optical system in the optical path.

BRIEF DESCRIPTION OF DRAWINGS

Embodiments of this disclosure will be illustrated by way of examples with reference to the accompanying drawings.

DESCRIPTION OF PREFERRED EMBODIMENTS

Figure 1:
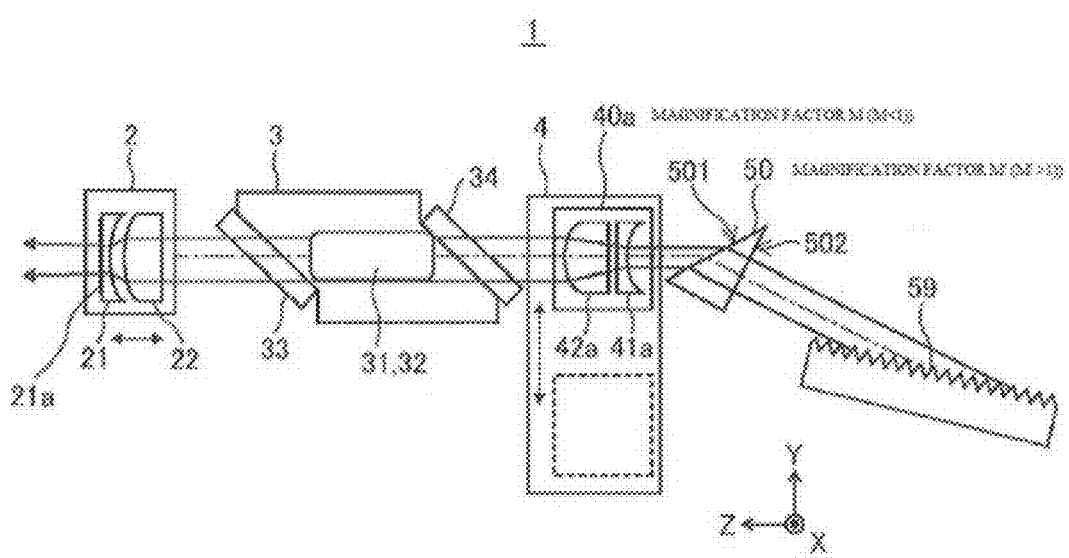
FIG. 1 is a schematic view illustrating the configuration of a laser apparatus according to a first embodiment.

Selected embodiments will now be described with reference to the accompanying drawings. The embodiments described below are for illustrative purposes only, and are in no way intended to unduly limit what is described in this disclosure. In addition, not all the components described in the embodiments are indispensable for implementing this disclosure. It should be noted that like reference numerals refer to like components, and duplicate descriptions thereof will be omitted.

1. First Embodiment

FIG. 1 is a schematic view illustrating the configuration of a laser apparatus according to a first embodiment. This laser apparatus 1 may include a wavefront adjuster 2, a laser chamber 3, a switching mechanism 4 for placing or removing a first beam-width change optical system in or from an optical path, a second beam-width change optical system 50, and a grating 59 in the order given from the output side.

1-1. Wavefront Adjuster

The wavefront adjuster 2 may include a cylindrical concave lens 21 and a cylindrical convex lens 22. The cylindrical concave lens 21 may have a flat surface on one side and a cylindrical concave surface on the other side. This flat surface 21a of the cylindrical concave lens 21 may be coated with a partial reflection film. With this configuration, the cylindrical concave lens 21 may serve as an output coupler for allowing part of the light output from the laser chamber 3 to pass therethrough to be output, while reflecting the other part of the light back into the laser chamber 3. Together with the grating 59, the cylindrical concave lens 21 may constitute an optical resonator. The distance between the flat surface 21a and the grating 59 may be set such that the light at a predetermined wavelength output from the laser chamber 3 forms a standing wave. The cylindrical convex lens 22 may have a flat surface on one side and a cylindrical convex surface on the other side.

Both the cylindrical concave lens 21 and the cylindrical convex lens 22 may have refraction properties for expanding or reducing beam widths in a first direction (Y-direction) perpendicular to the axis (Z-direction) of the light output from the laser chamber 3. The cylindrical concave lens 21 and the cylindrical convex lens 22 do not necessarily have refraction properties in a second direction (X-direction) perpendicular to both the optical axes thereof and the first direction.

In the wavefront adjuster 2, light having entered the cylindrical concave lens 21 through the cylindrical convex lens 22 may be reflected by or transmitted through the flat surface 21a with its beam width reduced by these lenses. The light reflected by the flat surface 21a may be outputted from the cylindrical convex lens 22 with its beam width expanded by these lenses.

The light passing through the cylindrical concave lens 21 and the cylindrical convex lens 22 may have different optical path lengths depending on whether the light passes through an area near the center axes of these lenses or an area near the edges of the lenses. The difference in the optical path lengths may depend on the distance between the cylindrical concave lens 21 and the cylindrical convex lens 22. The wavefront of light traveling in the optical resonator may be therefore adjusted by adjusting the distance between the cylindrical concave lens 21 and the cylindrical convex lens 22.

1-2. Laser Chamber

The laser chamber 3 may be filled with a laser medium, such as rare gas (e.g., helium, argon) and halogen gas (e.g., fluorine). In the laser chamber 3, for example, a pair of discharge electrodes 31 and 32 may be provided as an excitation source for exciting the laser medium. The discharge electrodes 31 and 32 may be connected to a power source. When a high voltage is applied from the power source between the discharge electrodes 31 and 32, a discharge may occur between the discharge electrodes 31 and 32. The energy generated by the discharge may excite the laser medium contained in the laser chamber 3, resulting in the laser medium transitioning into a higher energy level. When the excited laser medium makes its transition back to a lower energy level, light may be emitted of which the energy corresponds to the energy difference between the two levels.

The laser chamber 3 is preferably provided with windows 33 and 34, and the light generated in the laser chamber 3 may be transmitted through the windows 33 and 34. The light output from the laser chamber 3 may travel back and forth between the grating 59 and the flat surface 21a of the cylindrical concave lens 21, which constitute the optical resonator, and may be amplified every time the light passes through the space (laser gain space) between the discharge electrodes 31 and 32 in the laser chamber 3. Part of the amplified light may be output through the flat surface 21a of the cylindrical concave lens 21.

1-3. Second Beam-Width Change Optical System

The second beam-width change optical system 50 may be a prism arranged on the other side of the optical path through the laser gain space. The second beam-width change optical system 50 may have a first surface 501 on which the light output from the laser chamber 3 is incident and a second surface 502 through which the light incident on the first surface 501 is output toward the grating 59. By arranging the second beam-width change optical system 50 such that the first surface 501 is inclined with respect to the axis of the light output from the laser chamber 3, the light incident on the first surface 501 may be refracted into a first direction within the YZ plane. This configuration may expand the beam width in a second direction, which is perpendicular to the first direction within the YZ plane, while the beam width remains unexpanded in a third direction (X-direction) perpendicular to the YZ plane. The light having entered the second beam-width change optical system 50 may travel in a direction substantially perpendicular to the second surface 502 and may be output through the second surface 502 with little refraction.

The second beam-width change optical system 50 may thus expand the beam width of the light output from the laser chamber 3 and transmit the light toward the grating 59. Furthermore, the second beam-width change optical system 50 may reduce the beam width of the light reflected by the grating 59 and transmit the light toward the laser chamber 3. As illustrated in FIG. 1, the beam-width expansion direction (second direction) by the second beam-width change optical system 50 and the beam-width expansion or reduction direction (Y-direction) by the cylindrical concave lens 21 or the cylindrical convex lens 22 may be within substantially the same plane (YZ plane). When transmitting light, the second beam-width change optical system 50 may refract the light at different angles depending on the wavelength of the light. In other words, the second beam-width change optical system 50 may also function as a wavelength dispersion element.

1-4. Grating

The grating 59 may be a wavelength dispersion element made of a highly reflective material having numerous grooves. As illustrated in FIG. 1, the direction (X-direction) of each of the grooves in the grating 59 may be substantially perpendicular to the beam-width expansion or reduction direction (Y-direction) by the cylindrical concave lens 21 or the cylindrical convex lens 22. The light incident on the grating 59 from the second beam-width change optical system 50 may be reflected in multiple directions by the inclined surface of each groove. Angles at which the light rays are reflected depend on the optical length in the groove and the wavelength of the incident light. The phases of the reflected light rays having wavelengths corresponding to the difference in the optical path lengths coincide with each other, and therefore these light rays may be enhanced. By contrast, the phases of the reflected light rays having wavelengths not corresponding to the difference in the optical path lengths do not coincide with each other, and therefore these light rays may weaken one another. Such interferential action enhances light having a particular wavelength depending on the reflection angle, and the light having this particular wavelength may be returned to the laser chamber 3 through the second beam-width change optical system 50.

As described above, the second beam-width change optical system 50 and the grating 59 may constitute a line narrowing module for narrowing the spectral linewidth of output laser light. The wavelength selectivity of the second beam-width change optical system 50 and the grating 59 may be controlled by adjusting the wavefront using the wavefront adjuster 2. In this manner, the spectral linewidth of the light returned to the laser chamber 3 from the second beam-width change optical system 50 and the grating 59, and thus the spectral linewidth of the output laser light, may be controlled precisely. The wavelength selectivity of the second beam-width change optical system 50 and the grating 59 may also be controlled by, for example, bending the grating 59 and adjusting its curvature.

While only one prism is illustrated as the second beam-width change optical system 50 in FIG. 1, a plurality of prisms may be provided to achieve a desired magnification factor. In addition, while the description above illustrates the use of the second beam-width change optical system 50 and the grating 59 as a line narrowing module with the grating 59 serving also as one reflecting surface of the optical resonator, this disclosure is not limited to this example. Specifically, any wavelength dispersion element that output light at an angle depending on the wavelength may constitute a line narrowing module. For example, a plurality of prisms may constitute a line narrowing module, while a highly reflective mirror may serve as one reflecting surface of the optical resonator.

1-5. Switching Mechanism

The switching mechanism 4 may be configured to place or remove a first beam-width change optical system in or from the optical path between the laser chamber 3 and the second beam-width change optical system 50. In this embodiment, a first beam-width change optical system 40a may be composed of a combination of a cylindrical convex lens 42a and a cylindrical concave lens 41a. The first beam-width change optical system 40a may reduce the beam width of the light output from the laser chamber 3 and cause the resulting light to enter the second beam-width change optical system 50. The beam-width reduction direction (Y-direction) by the cylindrical convex lens 42a and the cylindrical concave lens 41a may be substantially the same as the beam-width expansion or reduction direction (Y-direction) by the cylindrical concave lens 21 or the cylindrical convex lens 22 of the wavefront adjuster 2 (i.e., the direction substantially perpendicular to the direction (X-direction) of each groove in the grating 59).

In the first beam-width change optical system 40a, the relative positional relationship between the cylindrical convex lens 42a and the cylindrical concave lens 41a is fixed. These lenses are configured to be movable as a group by the switching mechanism 4.

The first beam-width change optical system 40a may reduce the beam width of the light to enter the second beam-width change optical system 50, thereby significantly reducing the wavelength selectivity of the second beam-width change optical system 50 and the grating 59. In this manner, the spectral linewidth of the light returned to the laser chamber 3 from the second beam-width change optical system 50, and thus the spectral linewidth of the output laser light, may be expanded significantly. In this case, further fine adjustment of the spectral linewidth is available through the wavefront adjuster 2.

On the other hand, when a target spectral linewidth is small, the first beam-width change optical system 40a may be retracted from the optical path and be moved to a position indicated by the broken line in FIG. 1. This allows light whose beam width remains unreduced to enter the second beam-width change optical system 50, and the spectral linewidth of the output laser light may be reduced. Further fine adjustment of the spectral linewidth is available through the wavefront adjuster 2 in this case as well.

Referring to FIG. 1, M (M<1 because the first beam-width change optical system 40a reduces the beam width) denotes a beam-width magnification factor by the first beam-width change optical system 40a, and M' (M'>1) denotes a beam-width magnification factor by the second beam-width change optical system 50. The total beam-width magnification factor by the first beam-width change optical system 40a and the second beam-width change optical system 50 is represented by M×M'. If the first beam-width change optical system 40a is retracted from the optical path, the resulting beam-width magnification factor is M'. If the beam width of the light to enter the second beam-width change optical system 50 is multiplied by M, the spectral linewidth of the output laser light is about one-Mth of its former value.

According to this embodiment, as indicated by the dashed-dotted line in FIG. 1, the first beam-width change optical system 40a is positioned in the optical path such that the light entering the first beam-width change optical system 40a and the light output from the first beam-width change optical system 40a have substantially the same axis. In this manner, while the beam width of the light to enter the second beam-width change optical system 50 differs depending on whether the first beam-width change optical system 40a is positioned in or retracted from the optical path, the angle of incidence on the second beam-width change optical system 50 may remain unchanged. Accordingly, while the spectral linewidth of the light returned to the laser chamber 3 from the second beam-width change optical system 50 varies, the central wavelength of the light may be retained. This embodiment therefore does not necessarily require another optical system for adjusting the angle of incidence on the second beam-width change optical system 50. Since the spectral linewidth may be controlled independently from the central wavelength control, the spectral linewidth may be readily adjusted. This adjustment may allow the depth of focus of an optical system using laser light output from this laser apparatus to be increased.

The first beam-width change optical system 40a may be composed of an afocal optical system. As long as the light entering the first beam-width change optical system 40a is collimated light, the light output from the first beam-width change optical system 40a may be collimated light. Therefore, this configuration with the first beam-width change optical system 40a positioned in the optical path does not necessarily require a collimating optical system.

1-6. Adjustment of Spectral Linewidth

Figure 2:
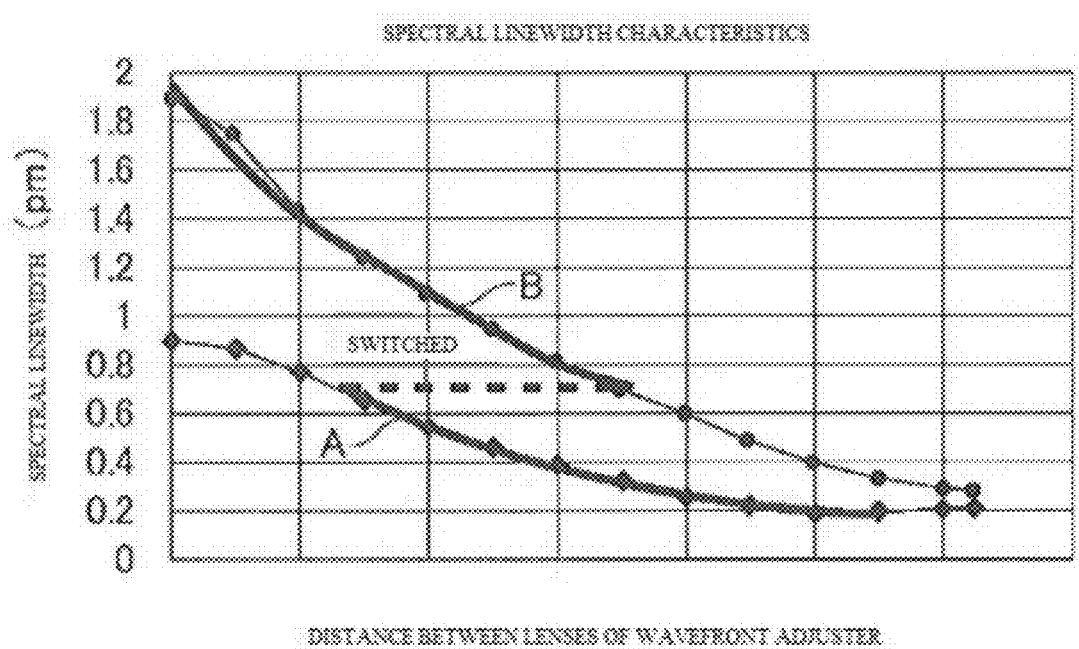
FIG. 2 is a graph depicting the adjustable ranges of a spectral linewidth in the first embodiment.

FIG. 2 is a graph depicting the adjustable ranges of the spectral linewidth in the first embodiment. The curve A represents the spectral linewidth of output laser light as a function of the distance between the lenses of the wavefront adjuster 2, with the first beam-width change optical system 40a illustrated in FIG. 1 retracted from the optical path (first state). The curve B represents the spectral linewidth of output laser light as a function of the distance between the lenses of the wavefront adjuster 2, with the first beam-width change optical system 40a illustrated in FIG. 1 positioned in the optical path (second state).

With the first beam-width change optical system 40a retracted from the optical path, the spectral linewidth is adjustable in a range from about 0.2 to 0.9 pm (first predetermined range) by adjusting the distance between the lenses of the wavefront adjuster 2, as indicated by the curve A. When a target spectral linewidth is larger than this range, the first beam-width change optical system 40a is to be positioned in the optical path, and then the spectral linewidth is adjustable in a range from about 0.3 to 1.9 pm (second predetermined range) by adjusting the distance between the lenses of the wavefront adjuster 2, as indicated by the curve B.

There may be a partial overlap between the range (first predetermined range) of spectral linewidth adjustable by the wavefront adjuster 2 with the first beam-width change optical system 40a retracted from the optical path and the range (second predetermined range) of spectral linewidth adjustable by the wavefront adjuster 2 with the first beam-width change optical system 40a positioned in the optical path. In other words, the spectral linewidth is controllable in a range from about 0.3 to 0.9 pm according to both the curves A and B. In this manner, an optimum method for controlling a target spectral linewidth may be selected from the curves A and B in consideration of various factors including loss of energy due to the first beam-width change optical system 40a positioned in the optical path and readiness of fine adjustment using the wavefront adjuster 2. FIG. 2 illustrates an example in which the curves A and B are switched at a spectral linewidth of about 0.7 pm.

1-7. First Modification

Figure 3:
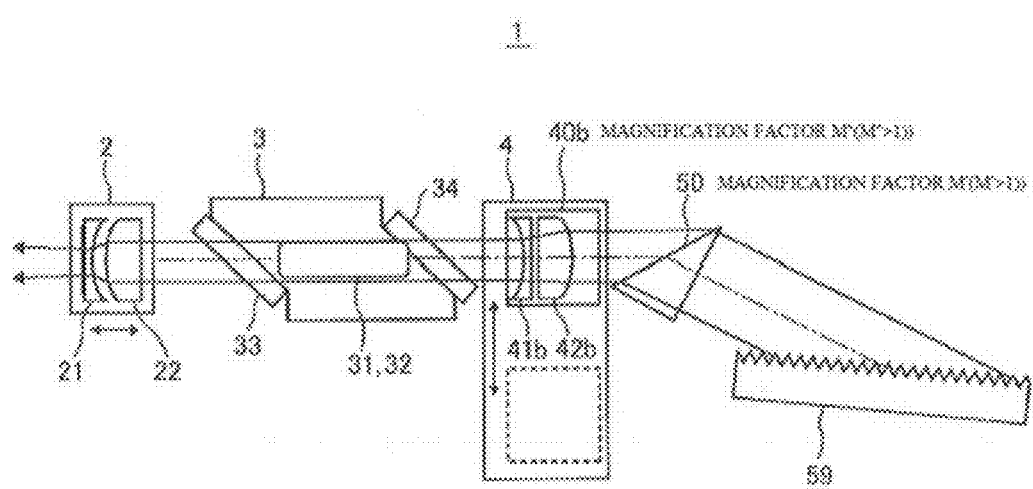
FIG. 3 is a schematic view illustrating a first modification of the first embodiment.

FIG. 3 is a schematic view illustrating a first modification of the first embodiment. The first modification differs from the first embodiment illustrated in FIG. 1 in that a first beam-width change optical system 40b may include a cylindrical concave lens 41b and a cylindrical convex lens 42b that are disposed inversely with respect to the corresponding lenses of the first beam-width change optical system 40a in the first embodiment illustrated in FIG. 1.

The first beam-width change optical system 40b may expand the beam width of light output from the laser chamber 3 and cause the resulting light to enter the second beam-width change optical system 50 in the first modification illustrated in FIG. 3. This may narrow the spectral linewidth of the output laser light compared with the case in which the first beam-width change optical system 40b is retracted from the optical path.

Referring to FIG. 3, M" (M">1 in this example) denotes a beam-width magnification factor by the first beam-width change optical system 40b, and M' (M'>1) denotes a beam-width magnification factor by the second beam-width change optical system 50. The total beam-width magnification factor by the first beam-width change optical system 40b and the second beam-width change optical system 50 is represented by: M"×M'. If the first beam-width change optical system 40b is retracted from the optical path, the resulting beam-width magnification factor is M'.

The maximum beam-width magnification factor in the example illustrated in FIG. 3 is M"×M', which is a magnification factor achieved with the first beam-width change optical system 40b positioned in the optical path. On the other hand, the maximum beam-width magnification factor in the first embodiment illustrated in FIG. 1 is M', which is a magnification factor achieved with the first beam-width change optical system 40a retracted from the optical path. To achieve a magnification factor equivalent to the maximum beam-width magnification factor in the first embodiment illustrated in FIG. 1 with the example illustrated in FIG. 3, the only thing needed is to satisfy the following formula: M"×M'=M'.

The beam width of the light output from the laser chamber 3 is expanded by the first beam-width change optical system 40b and the second beam-width change optical system 50, and the resulting light is incident on the grating 59 in the first modification illustrated in FIG. 3. In other words, the beam width of the light output from the laser chamber 3 may remain unreduced along the optical path until the light reaches the grating 59. Accordingly, the first modification results in no region having excessively high light intensity between the laser chamber 3 and the grating 59, thereby allowing optical elements employed in this laser apparatus to be selected from a wider range of options.

While FIG. 3 illustrates an example in which the beam-width magnification factor is switched by placing or removing the first beam-width change optical system 40b in or from the optical path, this disclosure is not limited to this example. For example, the beam-width magnification factor may be switched by inverting the first beam-width change optical system 40b in the optical path through the switching mechanism 4. With the first beam-width change optical system 40b inverted in the optical path, the resulting lens layout is similar to that in the first beam-width change optical system 40a illustrated in FIG. 1. In this manner, the beam width of the light may be reduced by inverting the first beam-width change optical system 40b in the optical path, and the resulting light may be caused to enter the second beam-width change optical system 50.

1-8. Second Modification

Figure 4:
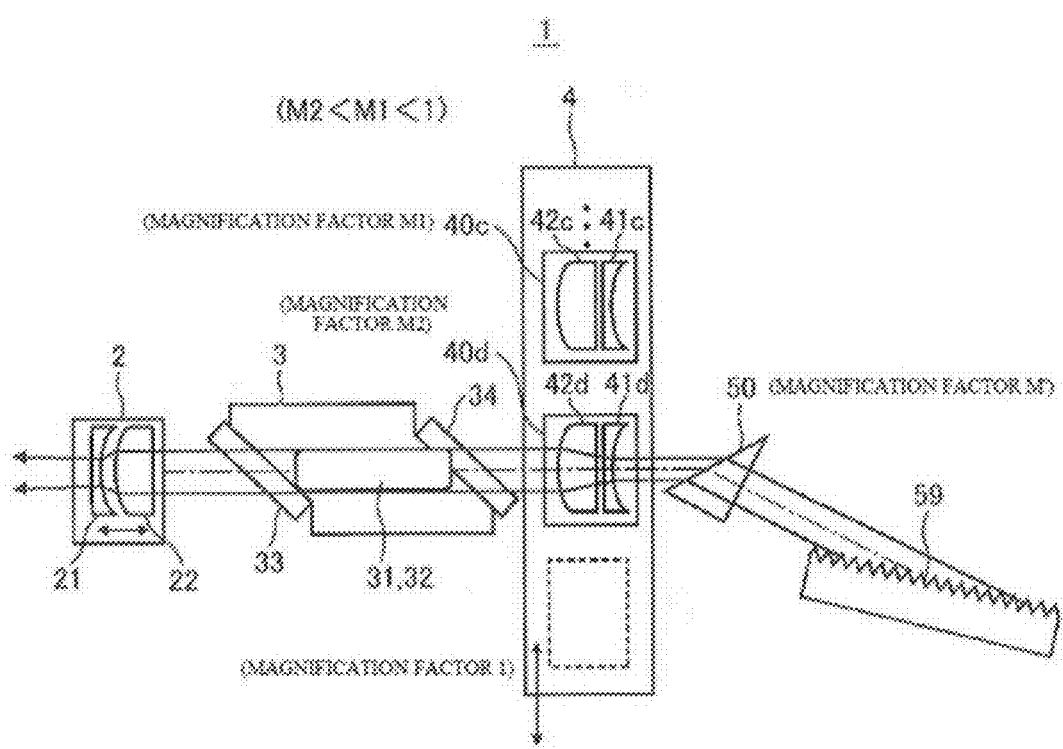
FIG. 4 is a schematic view illustrating a second modification of the first embodiment.

FIG. 4 is a schematic view illustrating a second modification of the first embodiment. The second modification differs from the first embodiment illustrated in FIG. 1 in that one of a plurality of first beam-width change optical systems 40c and 40d may be selected to be positioned in the optical path using the switching mechanism 4.

The first beam-width change optical system 40c may include a cylindrical convex lens 42c and a cylindrical concave lens 41c, and the first beam-width change optical system 40d may include a cylindrical convex lens 42d and a cylindrical concave lens 41d.

For example, M1 denotes a beam-width magnification factor by the first beam-width change optical system 40c, M2 denotes a beam-width magnification factor by the first beam-width change optical system 40d, and the following formula is satisfied: M2<M1<1. In this case, the minimum spectral linewidth may be achieved with both the first beam-width change optical systems 40c and 40d retracted from the optical path. Positioning the first beam-width change optical system 40c in the optical path may increase the spectral linewidth. Positioning the first beam-width change optical system 40d in place of the first beam-width change optical system 40c in the optical path may increase the spectral linewidth even further. In this manner, the second modification illustrated in FIG. 4 may further widen the adjustable ranges of spectral linewidth.

1-9. Third Modification

Figure 5A:
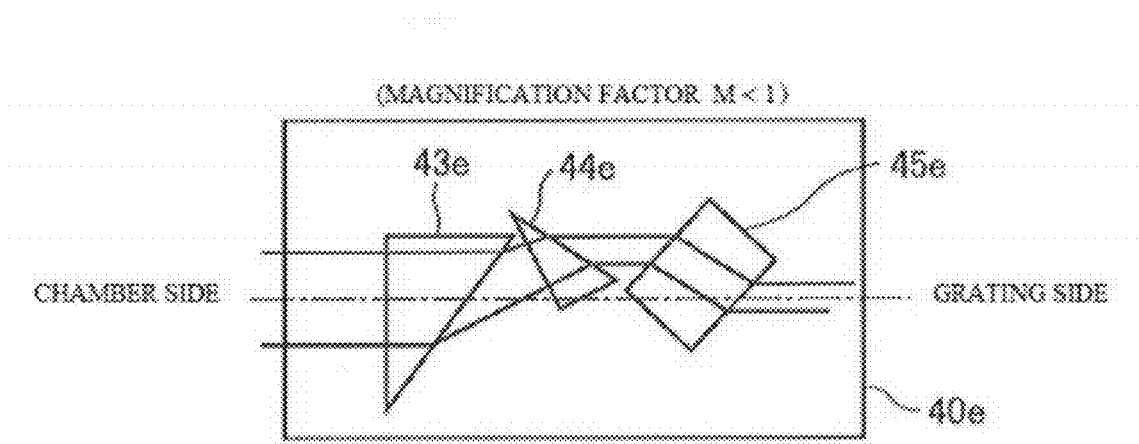
FIGS. 5A and 5B are schematic views illustrating a first beam-width change optical system in a third modification of the first embodiment.
Figure 5B:
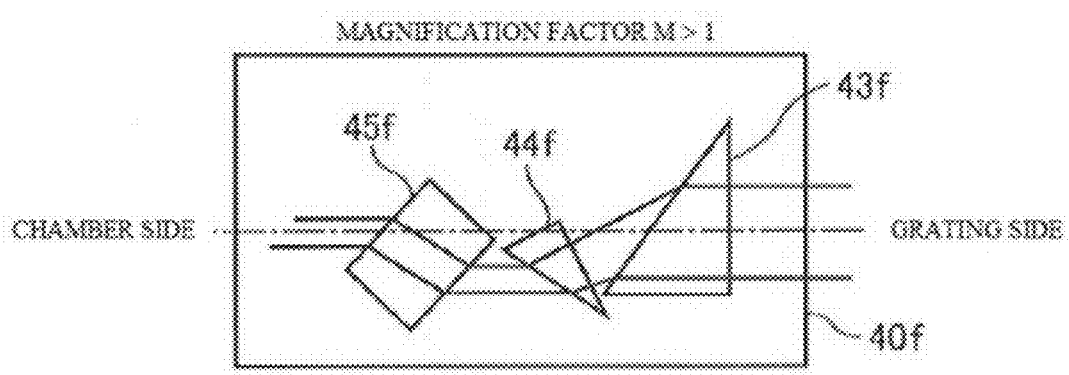

FIGS. 5A and 5B are schematic views illustrating first beam-width change optical systems in a third modification of the first embodiment. The wavefront adjuster 2, the laser chamber 3, the second beam-width change optical system 50, and the grating 59, for example, in this modification are the same as or similar to those in the first embodiment illustrated in FIG. 1.

The switching mechanism 4 may cause a first beam-width change optical system 40e illustrated in FIG. 5A to be placed in or removed from the optical path in the third modification. The first beam-width change optical system 40e may reduce the beam width of light to enter the second beam-width change optical system 50 (refer to FIG. 1) using prisms 43e and 44e. The first beam-width change optical system 40e may also cause its input and output axes to coincide with each other using a planar parallel plate 45e.

The switching mechanism 4 may cause a first beam-width change optical system 40f illustrated in FIG. 5B to be placed in or removed from the optical path in the third modification. The first beam-width change optical system 40f may expand the beam width of light to enter the second beam-width change optical system 50 using prisms 43f and 44f. The first beam-width change optical system 40f may also cause its input and output axes to coincident with each other using a planar parallel plate 45f.

While the input and output axes are made coincident with each other through the planar parallel plate 45e or 45f in the third modification illustrated in FIGS. 5A and 5B, this disclosure is not limited to this example. For example, the input and output axes may be made coincident with each other through a plurality of mirrors. In addition, while the third modification illustrates an example in which the first beam-width change optical systems 40e and 40f are placed in or removed from the optical path, this disclosure is not limited to this example. For example, the first beam-width change optical system 40e may be inverted in the optical path by the switching mechanism 4 to function in the same manner as the first beam-width change optical system 40f.

1-10. Fourth Modification

Figure 6:
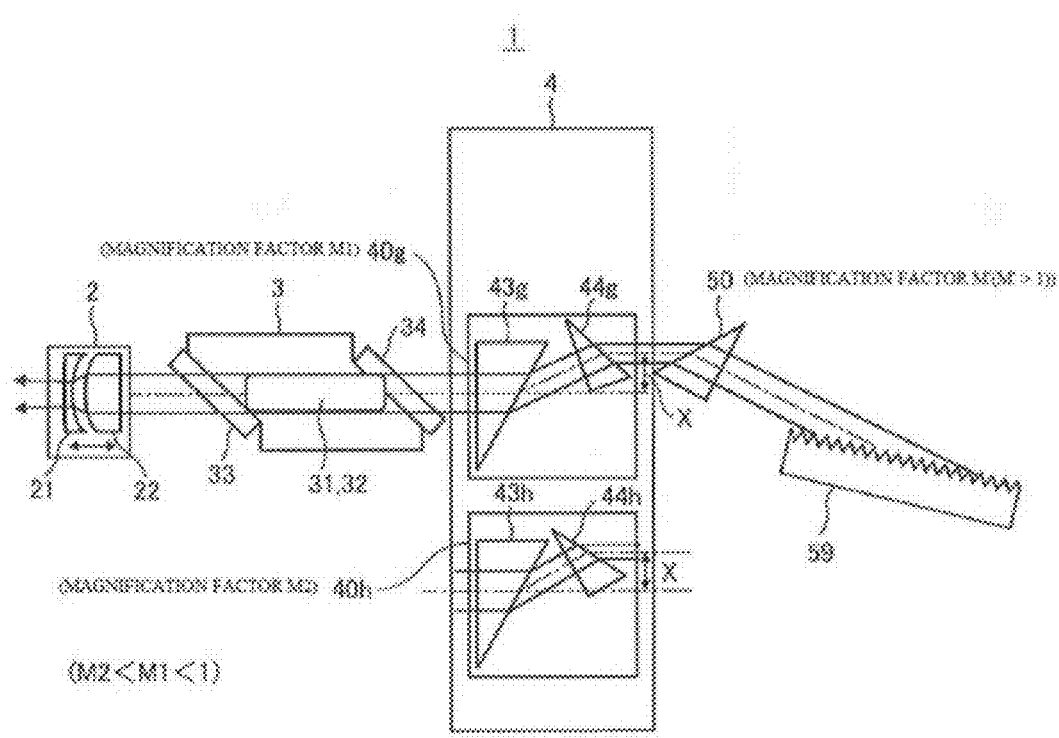
FIG. 6 is a schematic view illustrating a fourth modification of the first embodiment.

FIG. 6 is a schematic view illustrating a fourth modification of the first embodiment. In the fourth modification, the axis of light traveling through the laser chamber 3 and the axis of light entering the second beam-width change optical system 50 are substantially parallel to each other, and an offset X may be obtained between these axes. A first beam-width change optical system 40g (magnification factor M1) may have an offset X between the input and output axes, and a first beam-width change optical system 40h (magnification factor M2) may have the same offset X between the input and output axes. The switching mechanism 4 may switch the first beam-width change optical system 40g and the first beam-width change optical system 40h, thereby switching the beam-width magnification factor.

The first beam-width change optical system 40g may have a prism 43g and a prism 44g. The first beam-width change optical system 40h may have a prism 43h and a prism 44h. The beam-width magnification factors M1 and M2 by these first beam-width change optical systems satisfy the following formula: M2<M1<1. In this case, a larger spectral linewidth of output laser light may be achieved by positioning the first beam-width change optical system 40h in the optical path than by positioning the first beam-width change optical system 40g in the optical path.

The fourth modification illustrated in FIG. 6 eliminates the need for the planar parallel plates in the third modification illustrated in FIGS. 5A and 5B and may reduce the size of the laser apparatus. In addition, loss of energy due to the passage of light through such planar parallel plates may be reduced.

While the fourth modification in FIG. 6 illustrates an example in which the first beam-width change optical systems 40g and 40h are placed in or removed from the optical path, this disclosure is not limited to this example. For example, the first beam-width change optical system 40g or 40h may be inverted in the optical path by the switching mechanism 4 to change the beam-width magnification factor.

1-11. Fifth Modification

Figure 7A:
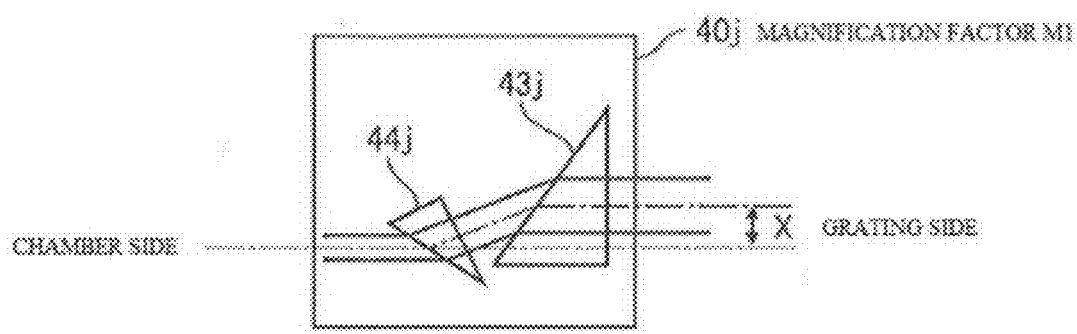
FIGS. 7A and 7B are schematic views illustrating a first beam-width change optical system in a fifth modification of the first embodiment.
Figure 7B:
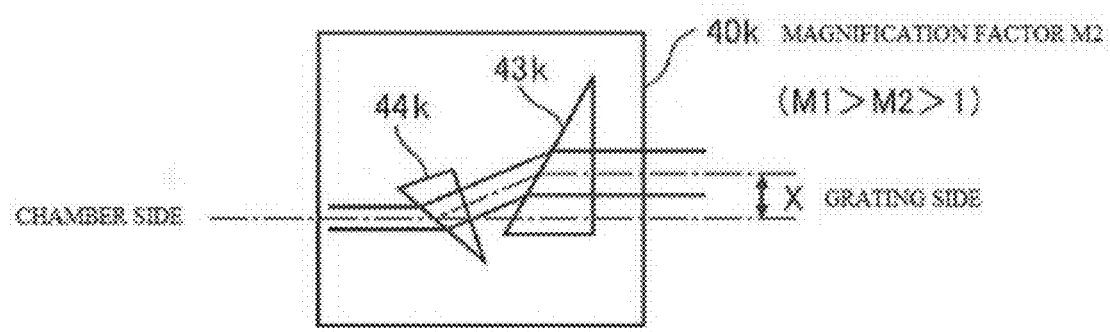

FIGS. 7A and 7B are schematic views illustrating first beam-width change optical systems in a fifth modification of the first embodiment. The wavefront adjuster 2, the laser chamber 3, the second beam-width change optical system 50, and the grating 59, for example, in this modification are the same as or similar to those in the fourth modification illustrated in FIG. 6.

In the fifth modification, the switching mechanism 4 may switch a first beam-width change optical system 40j (magnification factor M1) illustrated in FIG. 7A and a first beam-width change optical system 40k (magnification factor M2) illustrated in FIG. 7B, thereby placing or removing these first beam-width change optical systems in or from the optical path. The first beam-width change optical system 40j may expand the beam width of light to enter the second beam-width change optical system 50 using a prism 43j and a prism 44j. The first beam-width change optical system 40k may expand the beam width of light to enter the second beam-width change optical system 50 using a prism 43k and a prism 44k.

In the fifth modification illustrated in FIGS. 7A and 7B, the beam width of light output from the laser chamber is expanded by the first beam-width change optical system 40j or 40k, and the resulting light travels toward the grating. In other words, the beam width of the light output from the laser chamber may remain unreduced along the optical path until the light reaches the grating. Accordingly, the fifth modification results in no region having excessively high light intensity between the laser chamber and the grating, thereby allowing optical elements employed in this laser apparatus to be selected from a wider range of options.

1-12. Sixth Modification

Figure 8A:
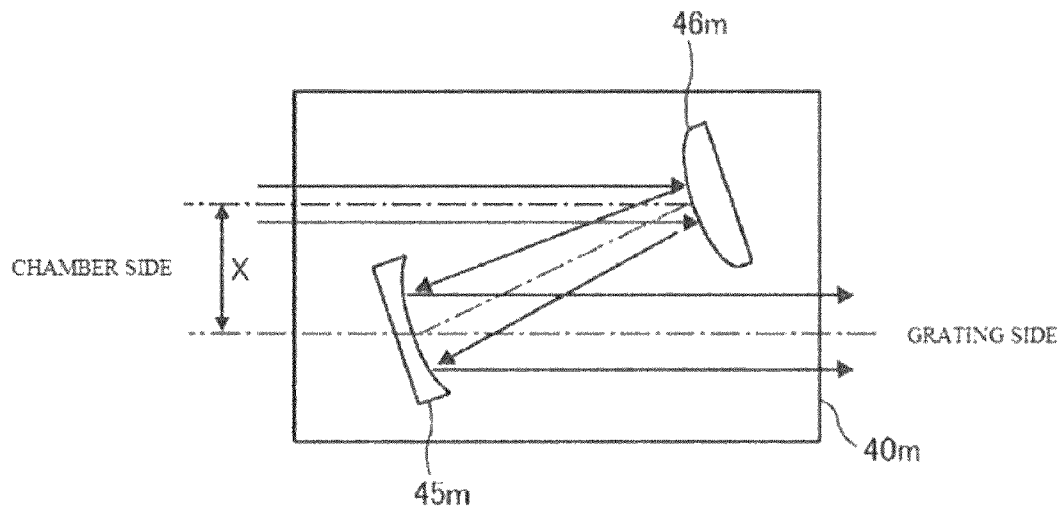
FIGS. 8A and 8B are schematic views illustrating a first beam-width change optical system in a sixth modification of the first embodiment.
Figure 8B:
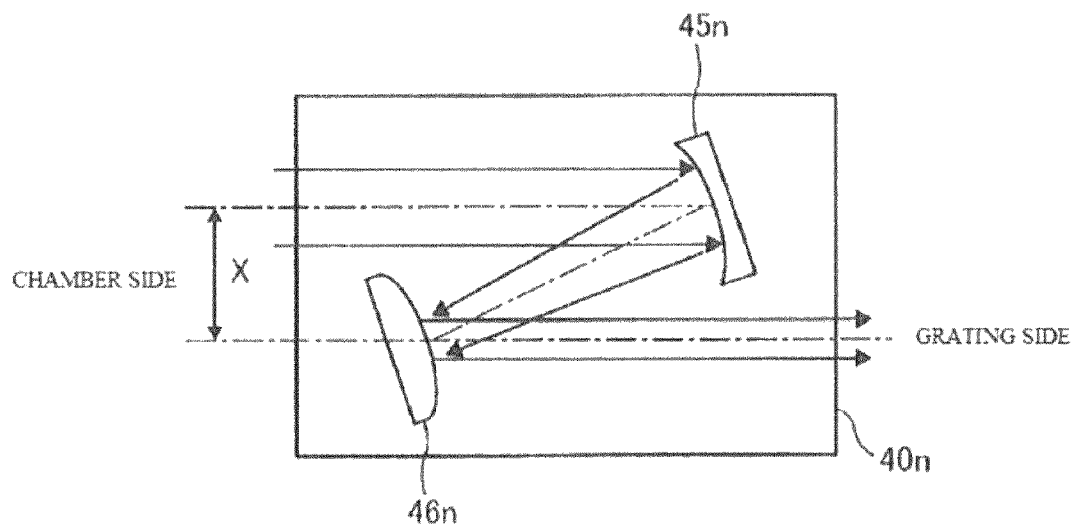

FIGS. 8A and 8B are schematic views illustrating first beam-width change optical systems in a sixth modification of the first embodiment. The wavefront adjuster 2, the laser chamber 3, the second beam-width change optical system 50, and the grating 59, for example, in this modification are the same as or similar to those in the fourth modification illustrated in FIG. 6.

In the sixth modification, the switching mechanism 4 may switch a first beam-width change optical system 40m (magnification factor M>1) illustrated in FIG. 8A and a first beam-width change optical system 40n (magnification factor M<1) illustrated in FIG. 8B, thereby placing or removing these first beam-width change optical systems in or from the optical path. The first beam-width change optical system 40m may expand the beam width of light to enter the second beam-width change optical system 50 using a cylindrical concave mirror 45m and a cylindrical convex mirror 46m. The first beam-width change optical system 40n may reduce the beam width of light to enter the second beam-width change optical system 50 using a cylindrical concave mirror 45n and a cylindrical convex mirror 46n.

While the sixth modification illustrates an example in which the first beam-width change optical systems 40m and 40n are placed in or removed from the optical path, this disclosure is not limited to this example. For example, the first beam-width change optical system 40m or 40n may be inverted in the optical path by the switching mechanism 4 to change the beam-width magnification factor.

2. Second Embodiment

Figure 9:
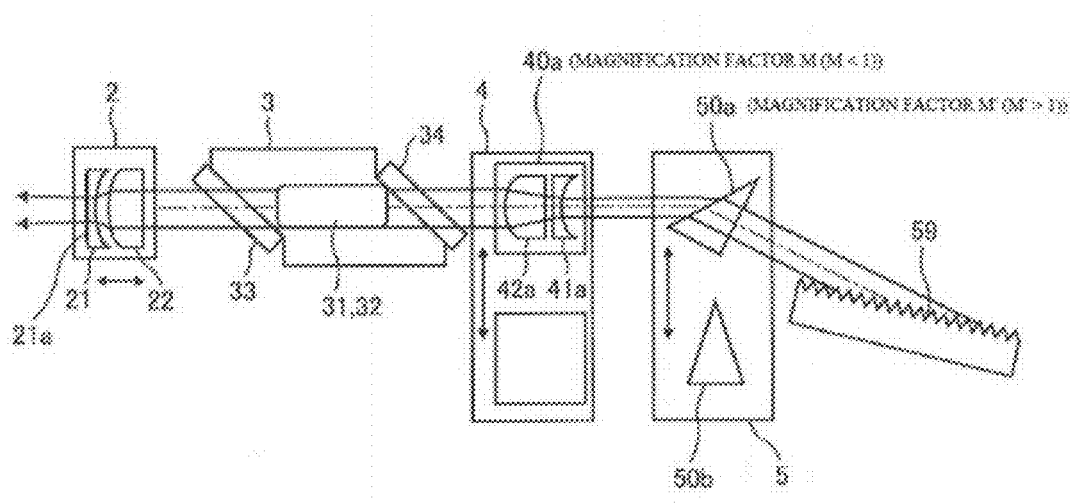
FIG. 9 is a schematic view illustrating the configuration of a laser apparatus according to a second embodiment.

FIG. 9 is a schematic view illustrating the configuration of a laser apparatus according to a second embodiment. The second embodiment differs from the first embodiment illustrated in FIG. 1 in that the laser apparatus according to the second embodiment includes a second switching mechanism 5 for placing or removing a second beam-width change optical system 50a in or from an optical path. The second switching mechanism 5 may select one of the second beam-width change optical system 50a and an optical-path retaining prism 50b to be placed in the optical path.

The second beam-width change optical system 50a may be the same as or similar in configuration to the second beam-width change optical system 50 described above with reference to FIG. 1. Specifically, the second beam-width change optical system 50a may expand the beam width of light output from the laser chamber 3, and refract and transmit the light toward the grating 59.

On the other hand, the optical-path retaining prism 50b has no beam-width changing function. Accordingly, by switching the second beam-width change optical system 50a and the optical-path retaining prism 50b, the beam-width magnification factor in the optical path between the laser chamber 3 and the grating 59 may be changed and the spectral linewidth of the output laser light may be changed.

In addition, the optical-path retaining prism 50b may refract the light output from the laser chamber 3 and transmit the light toward the grating 59. The refraction angle of the light at the optical-path retaining prism 50b may be the same as the refraction angle of the light at the second beam-width change optical system 50a. Therefore, the layout of the grating 59 or the other optical elements need not necessarily be changed when switching the second beam-width change optical system 50a and the optical-path retaining prism 50b.

According to the second embodiment, the beam-width magnification factor may be further changed with the second switching mechanism 5, in addition to the change in the beam-width magnification factor using the switching mechanism 4. This may enhance flexibility in the design of a laser apparatus capable of changing the spectral linewidth of output laser light.

While the second embodiment illustrates an example in which the second beam-width change optical system 50*a* and the optical-path retaining prism 50*b* are switched, this disclosure is not limited to this example. For example, the second beam-width change optical system 50*a* and another beam-width change optical system may be switched by the switching mechanism 4.

2-1. First Modification

Figure 10A:
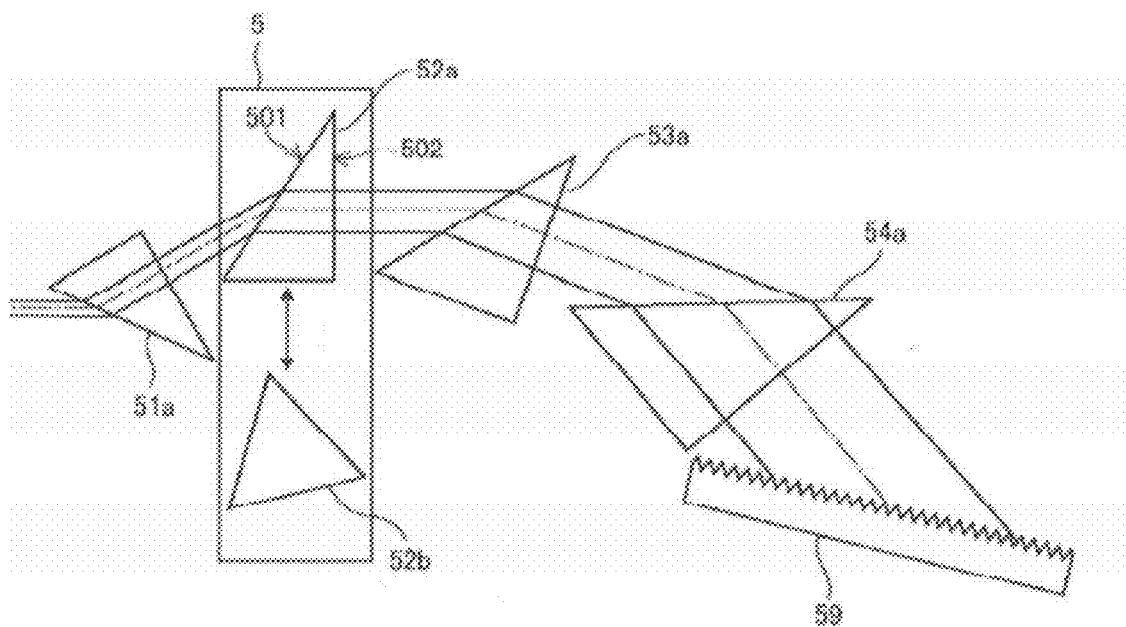
FIGS. 10A and 10B are schematic views illustrating a line narrowing module in a first modification of the second embodiment.
Figure 10B:
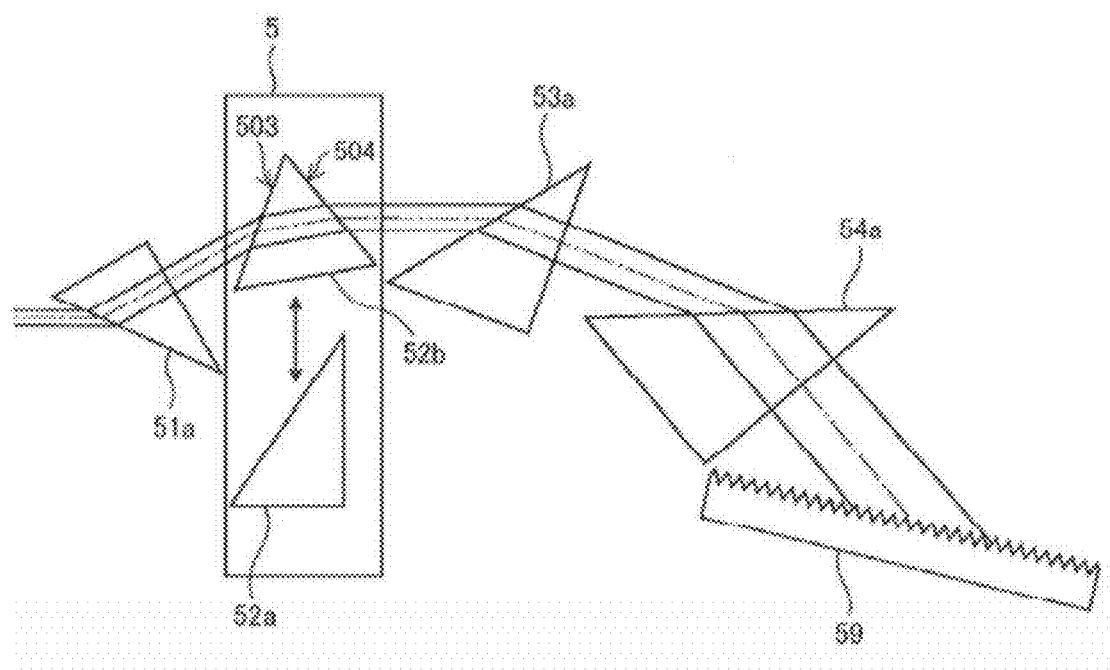

FIGS. 10A and 10B are schematic views illustrating a line narrowing module in a first modification of the second embodiment. In the first modification, a beam expander prism 51*a*, the second switching mechanism 5, a beam expander prism 53*a*, a beam expander prism 54*a*, and the grating 59 may constitute this line narrowing module.

The second switching mechanism 5 may be a mechanism for selectively placing a second beam-width change optical system 52*a* or an optic al-path retaining prism 52*b* in the optical path. Light output from the laser chamber 3 (refer to FIG. 9) has its beam width expanded while passing through the beam expander prism 51*a*, the optical element placed in the optical path by the second switching mechanism 5, the beam expander prism 53*a*, and the beam expander prism 54*a*, and the resulting light may be incident on the grating 59. By switching the optical elements using the second switching mechanism 5, the beam-width magnification factor in the optical path between the laser chamber 3 and the grating 59 may be changed and the spectral linewidth of the output laser light may be changed.

The second beam-width change optical system 52*a* is the same as or similar to the second beam-width change optical system 50*a* illustrated in FIG. 9. The optical-path retaining prism 52*b* is the same as or similar to the optical-path retaining prism 50*b* illustrated in FIG. 9. Specifically, the second beam-width change optical system 52*a* may be a prism having a first surface 501 and a second surface 502 as illustrated in FIGS. 10A and 10B. This prism may refract the incident light output from the laser chamber 3 (refer to FIG. 9) on the first surface 501, thereby expanding the beam width of the light. This prism may also cause the incident light that has traveled through the first surface 501 not to be refracted on the second surface 502 and output the light toward the grating 59 without expanding or reducing its beam width. By contrast, the optical-path retaining prism 52*b* may refract the incident light output from the laser chamber 3 on a first surface 503, thereby expanding the beam width of the light. Then, the optical-path retaining prism 52*b* may re-refract the incident light that has traveled through the first surface on a second surface 504, thereby reducing the beam width, and output the resulting light toward the grating 59.

The optical-path retaining prism 52*b* may thus transmit the light at the same refraction angle as the refraction angle of the light at the second beam-width change optical system 52*a* without changing the beam width of the light. Accordingly, without changing the arrangement of the grating 59 or other optical elements, the beam-width magnification factor in the optical path between the laser chamber 3 and the grating 59 may be changed and the spectral linewidth of the output laser light may be changed by switching the second beam-width change optical system 52*a* and the optical-path retaining prism 52*b*.

The second switching mechanism 5 may move the second beam-width change optical system 52*a* and the optical-path retaining prism 52*b* in the vertical direction of FIGS. 10A and 10B or move them in the direction perpendicular to the plane of FIGS. 10A and 10B. Furthermore, the second switching mechanism 5 may move the second beam-width change optical system 52*a* and the optical-path retaining prism 52*b* without changing their inclination or may move them while rotating them.

2-2. Second Modification

Figure 11A:
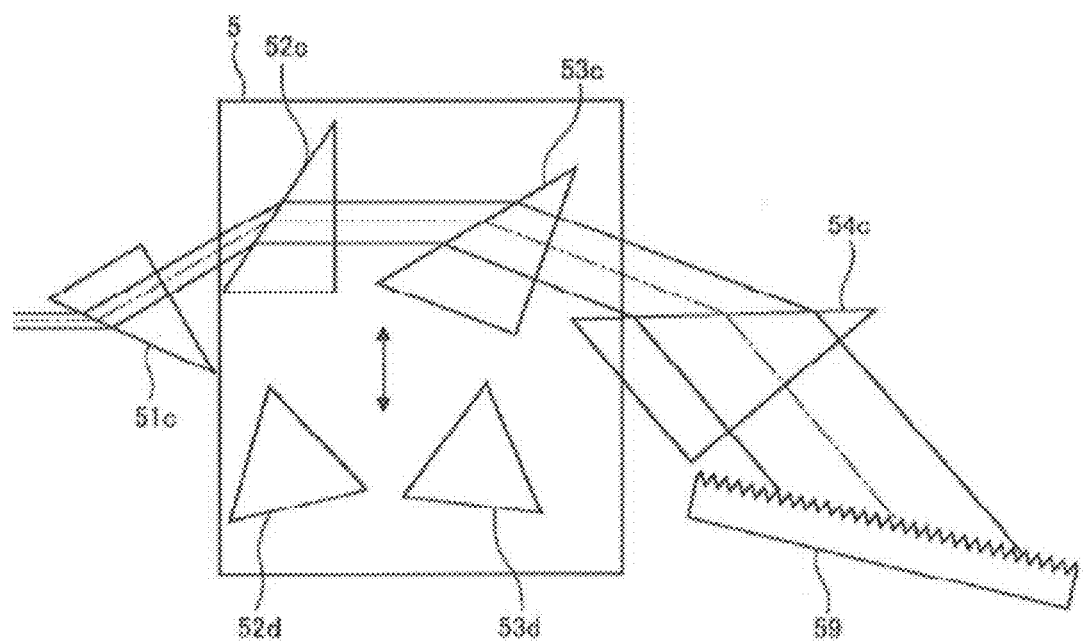
FIGS. 11A and 11B are schematic views illustrating a line narrowing module in a second modification of the second embodiment.
Figure 11B:
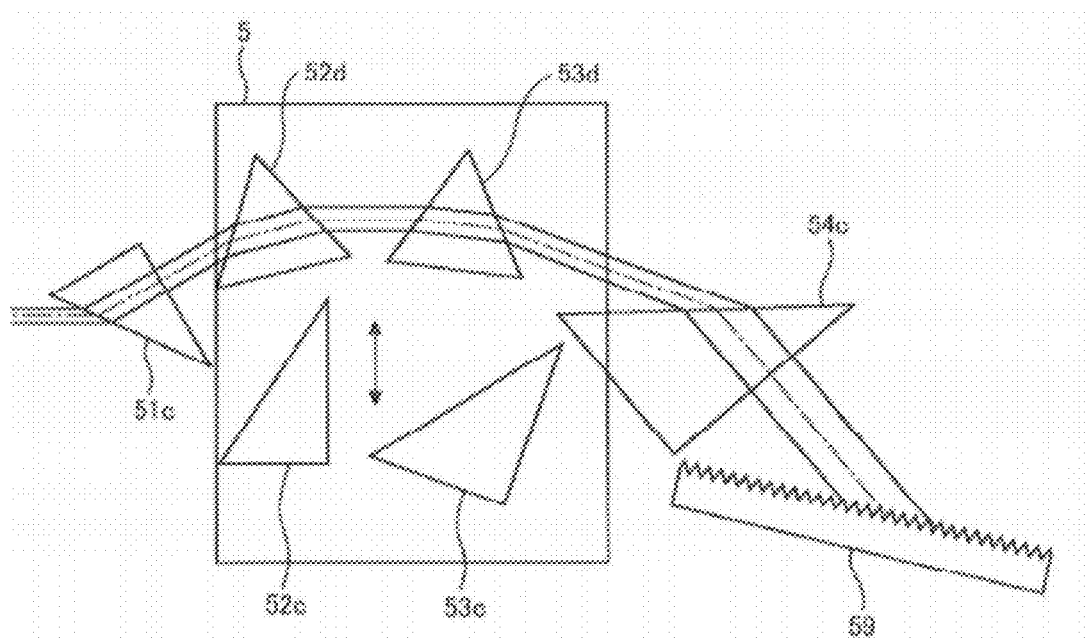

FIGS. 11A and 11B are schematic views illustrating a line narrowing module in a second modification of the second embodiment. In the second modification, a beam expander prism 51*c*, the second switching mechanism 5, a beam expander prism 54*c*, and the grating 59 may constitute this line narrowing module.

The second switching mechanism 5 may be a mechanism for selectively placing either (1) a set of second beam-width change optical systems 52*c* and 53*c* or (2) a set of optical-path retaining prisms 52*d* and 53*d* in the optical path. Light output from the laser chamber 3 (refer to FIG. 9) has its beam width expanded while passing through the beam expander prism 51*c*, the set of the optical elements placed in the optical path by the second switching mechanism 5, and the beam expander prism 54*c*, and the resulting light may be incident on the grating 59. By switching the two sets of optical elements using the second switching mechanism 5, the beam-width magnification factor in the optical path between the laser chamber 3 and the grating 59 may be changed and the spectral linewidth of the output laser light may be changed.

While the second modification in FIGS. 11A and 11B illustrates an example in which each of the sets of optical elements placed in or removed from the optical path by the second switching mechanism 5 includes two optical elements, this disclosure is not limited to this example. For example, each of the sets of optical elements may include three or more optical elements. Alternatively, n optical elements may be replaced with m optical elements (where n and m are different natural numbers).

2-3. Third Modification

Figure 12A:
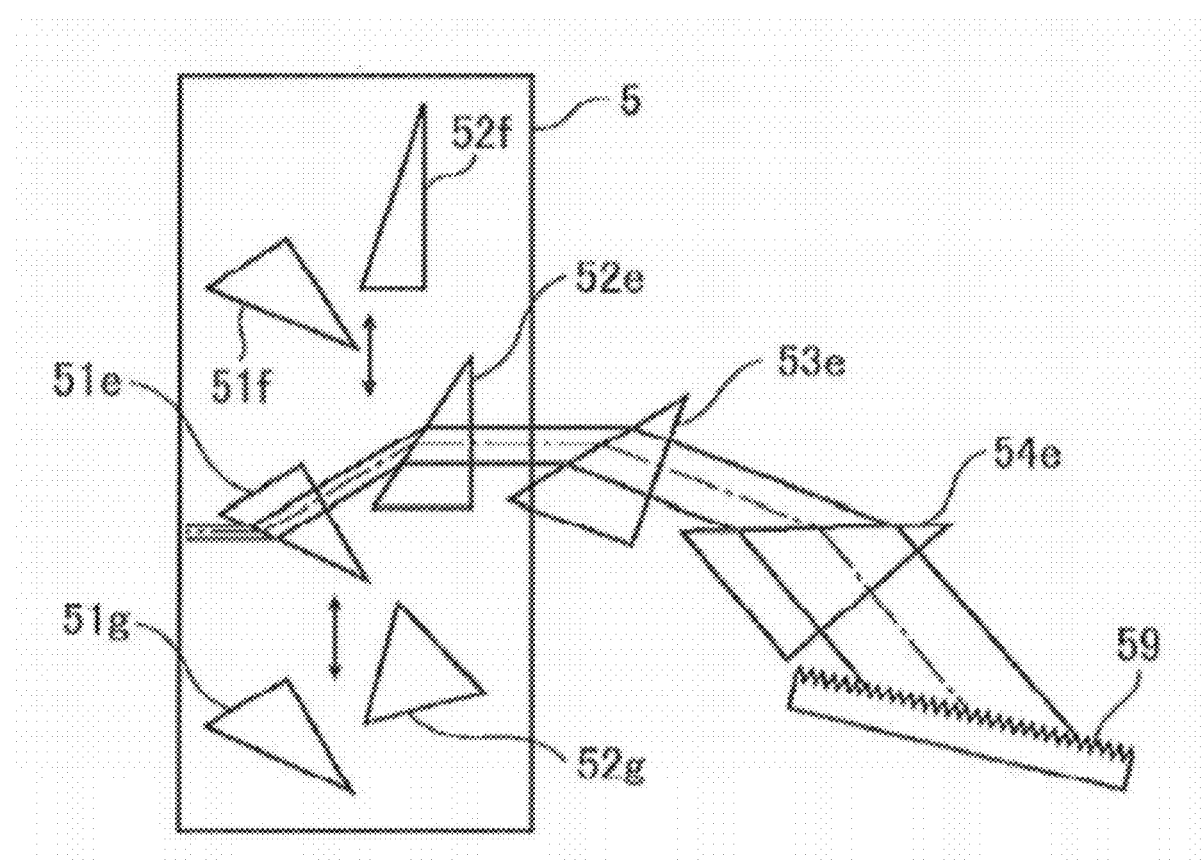
FIGS. 12A through 12C are schematic views illustrating a line narrowing module in a third modification of the second embodiment.
Figure 12B:
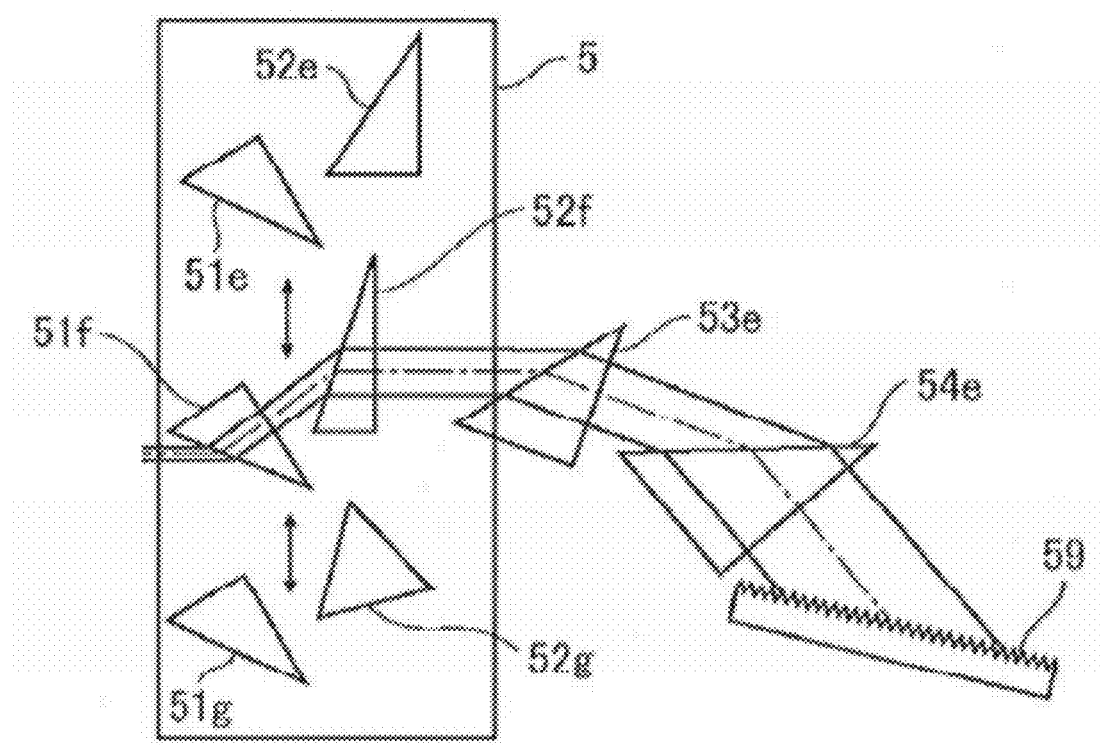
Figure 12C:
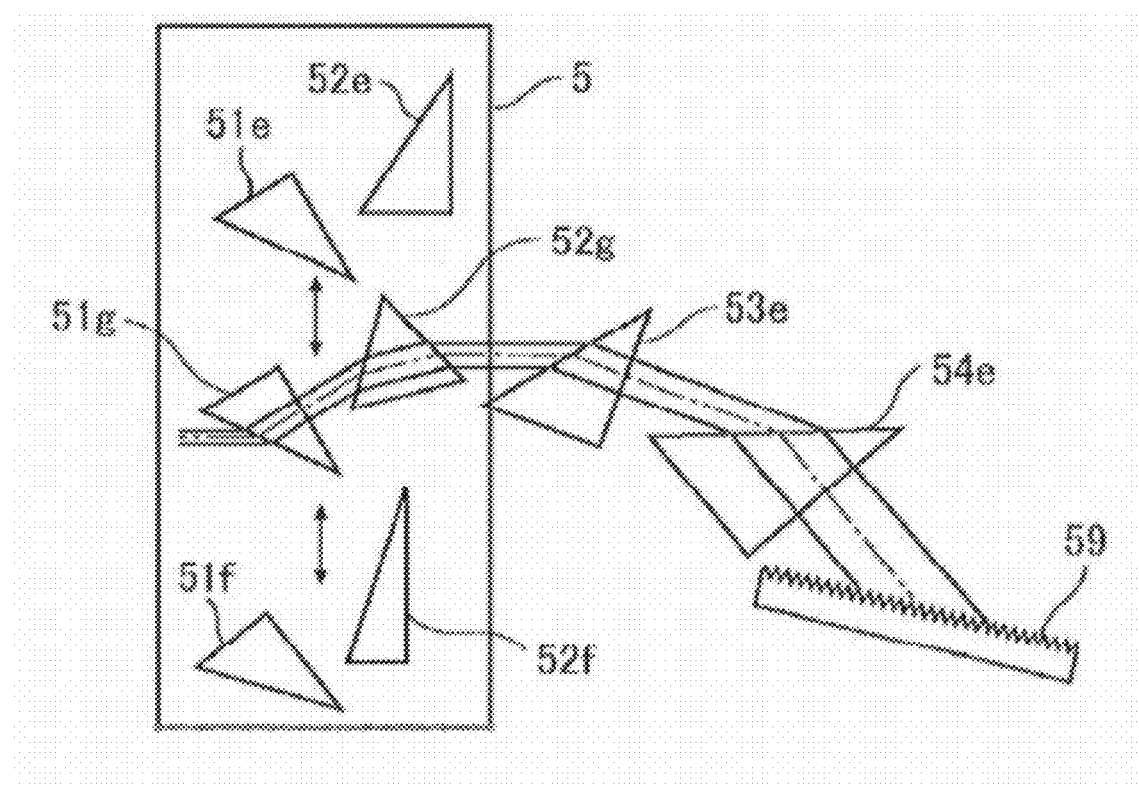

FIGS. 12A, 12B, and 12C are schematic views illustrating a line narrowing module in a third modification of the second embodiment. In the third modification, the second switching mechanism 5, a beam expander prism 53*e*, a beam expander prism 54*e*, and the grating 59 may constitute this line narrowing module.

The second switching mechanism 5 may be a mechanism for selectively placing either (1) a set of second beam-width change optical systems 51*e* and 52*e*, (2) a set of second beam-width change optical systems 51*f* and 52*f*, or (3) a set of a second beam-width change optical system 51*g* and an optical-path retaining prism 52*g* in the optical path. Light output from the laser chamber 3 (refer to FIG. 9) has its beam width expanded while passing through the set of the optical elements placed in the optical path by the second switching mechanism 5, the beam expander prism 53*e*, and the beam expander prism 54*e*, and the resulting light may be incident on the grating 59. By switching the optical elements using the second switching mechanism 5, the beam-width magnification factor in the optical path between the laser chamber 3 and the grating 59 may be changed and the spectral linewidth of the output laser light may be changed.

3. Third Embodiment

Figure 13:
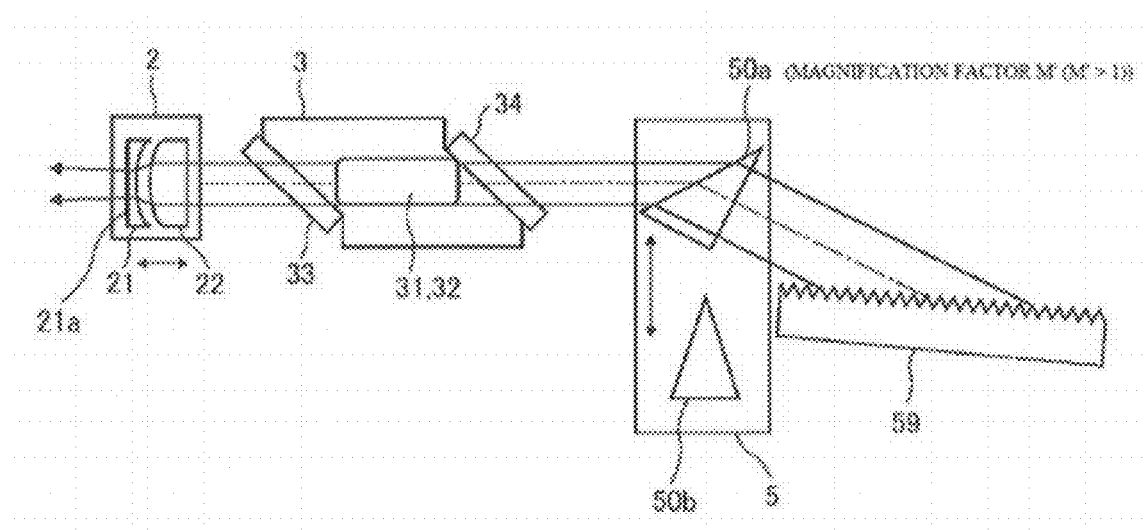
FIG. 13 is a schematic view illustrating the configuration of a laser apparatus according to a third embodiment.

FIG. 13 is a schematic view illustrating the configuration of a laser apparatus according to a third embodiment. The third embodiment differs from the second embodiment in that the laser apparatus according to the third embodiment does not include the switching mechanism 4 (refer to FIG. 9), while it includes the second switching mechanism 5 for placing or removing the second beam-width change optical system 50*a* in or from the optical path. As in the second embodiment, the modifications described above with reference to FIGS. 10A through 12C are applicable to the third embodiment.

The beam width of light output from the laser chamber 3 is expanded by the second beam-width change optical system 50a or retained by the optical-path retaining prism 50b, and the resulting light is incident on the grating 59 in the third embodiment. In other words, the beam width of the light output from the laser chamber 3 may remain unreduced along the optical path until the light reaches the grating 59. Accordingly, the third embodiment results in no region having excessively high light intensity between the laser chamber 3 and the grating 59, thereby allowing optical elements employed in this laser apparatus to be selected from a wider range of options.

4. Fourth Embodiment

Figure 14A:
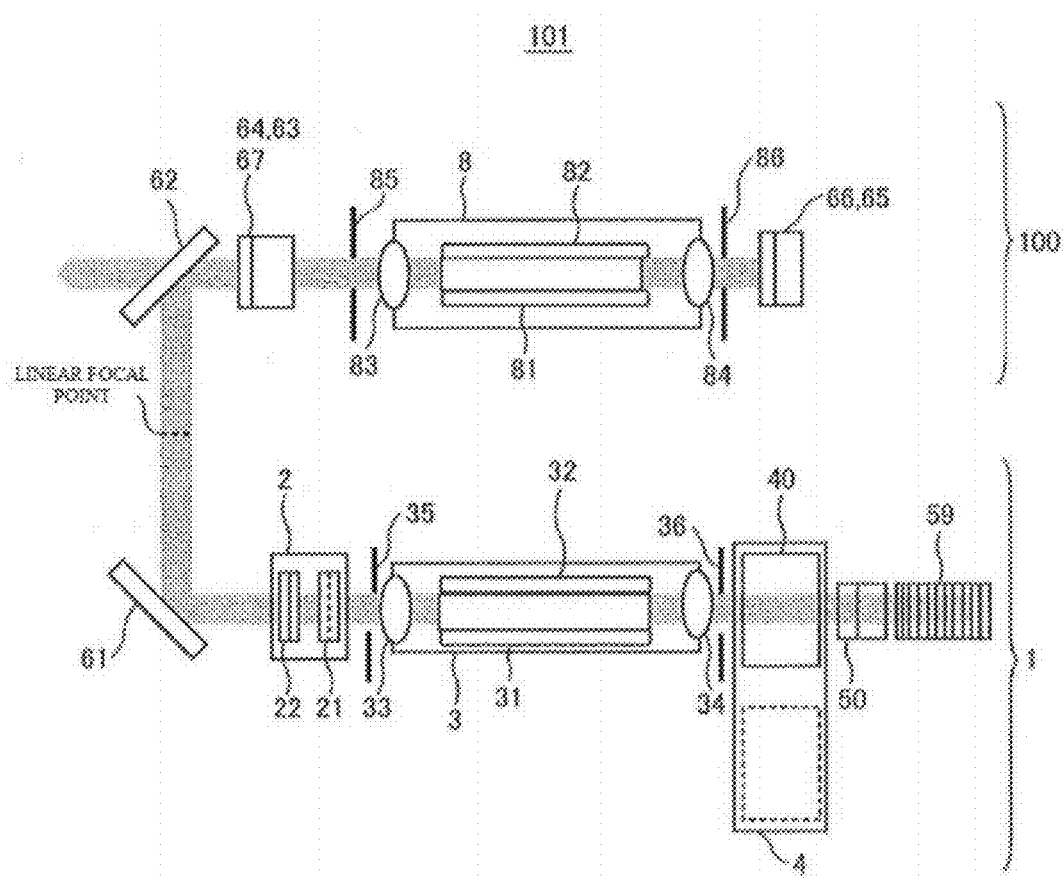
FIGS. 14A and 14B are schematic views illustrating the configuration of a laser apparatus according to a fourth embodiment.
Figure 14B:
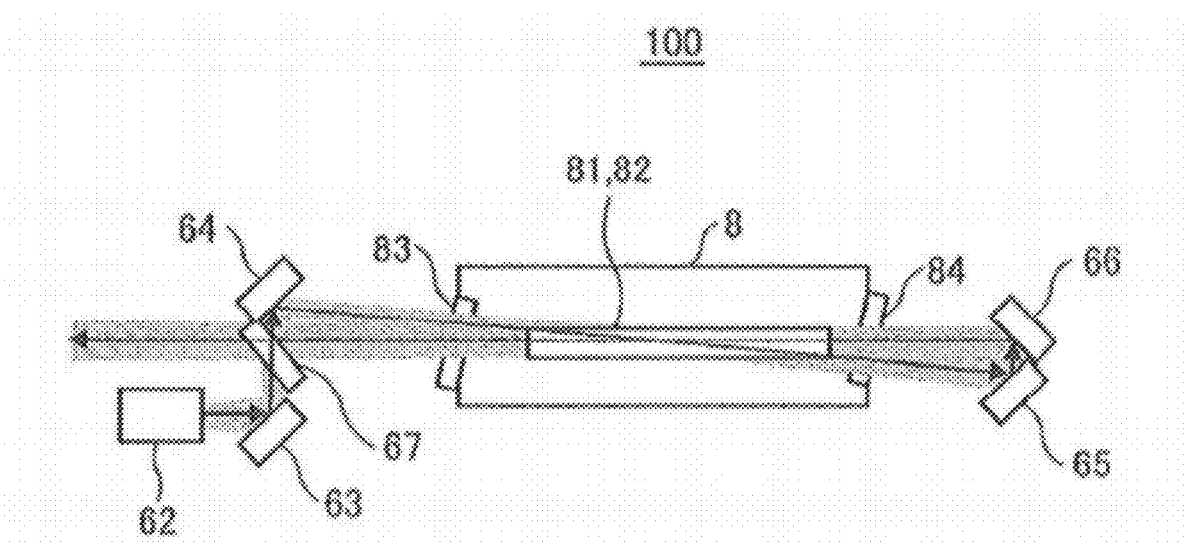

FIGS. 14A and 14b are schematic views illustrating the configuration of a laser apparatus according to a fourth embodiment, FIG. 14A being a side view and FIG. 14B being a top view. This laser apparatus 101 may be configured as a master oscillator/power oscillator (MOPO) system including the laser apparatus 1 functioning as a master oscillator for generating seed light and a power oscillator 100 for amplifying the seed light output from the laser apparatus 1.

The laser apparatus 1 may have a configuration the same as or similar to that of the first through third embodiments or their modifications, and generate seed light having a predetermined spectral linewidth. The laser apparatus 1 may have slits 35 and 36, through which light at a selected wavelength is allowed to pass, on the front and rear of the laser chamber 3. The laser light output from the laser apparatus 1 may be guided to a partial reflection mirror (output coupler) 67 of the power oscillator 100 via high reflection mirrors 61, 62, and 63.

The power oscillator 100 may include a ring resonator for circulating the laser light using high reflection mirrors 64, 65, and 66 and the partial reflection mirror 67. The power oscillator 100 may circulate the laser light so as to cause the laser light to pass through a laser chamber 8, thereby amplifying the laser light. The laser chamber 8 may, as in the laser chamber 3 in the laser apparatus 1, include a pair of discharge electrodes 81 and 82 and windows 83 and 84. Slits 85 and 86, through which light at a selected wavelength is allowed to pass, may be provided on the front and rear of the laser chamber 8.

The laser light having been amplified by the power oscillator 100 may be output as output laser light via the partial reflection mirror (output coupler) 67. According to this embodiment, the power oscillator 100 may amplify the seed light even if the energy of the seed light has been changed to some extent due to the control of the spectral linewidth in the laser apparatus 1; therefore, the power oscillator 100 can output laser light in a stable manner.

5. Fifth Embodiment

Figure 15:
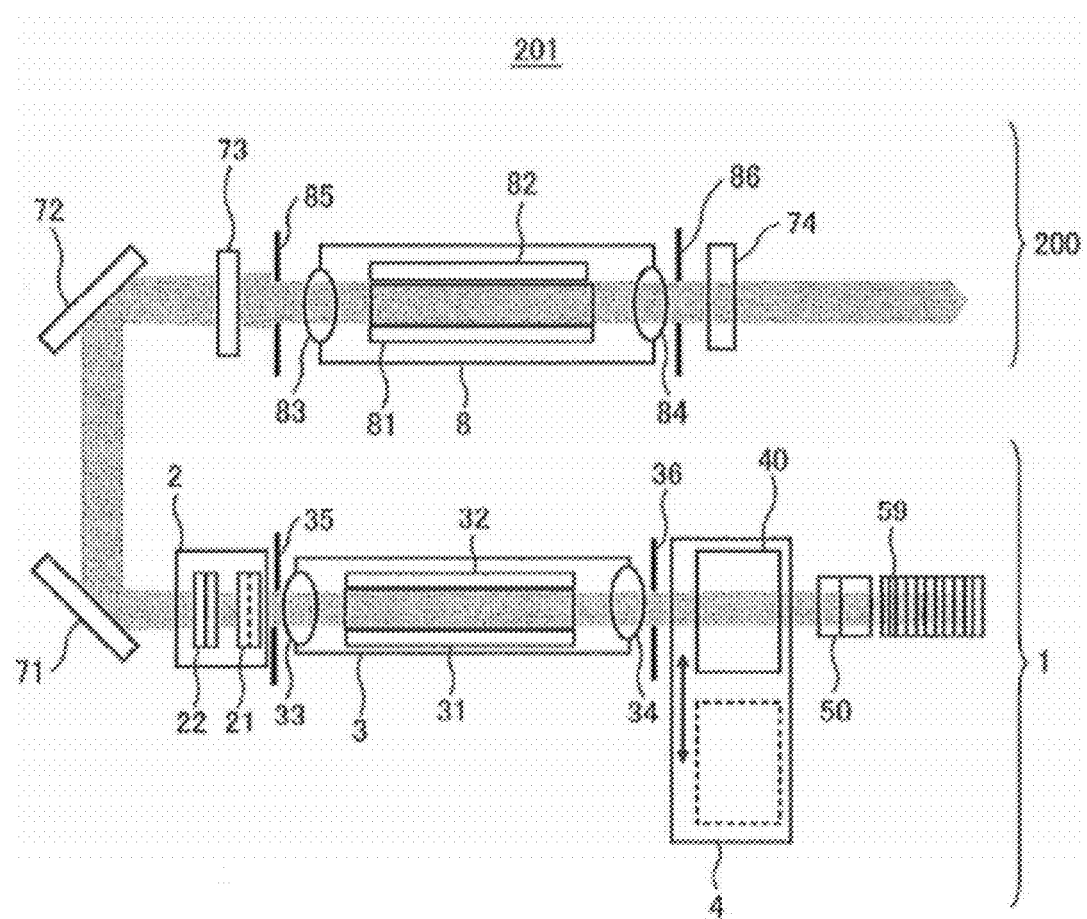
FIG. 15 is a schematic view illustrating the configuration of a laser apparatus according to a fifth embodiment.

FIG. 15 is a schematic view illustrating the configuration of a laser apparatus according to a fifth embodiment. This laser apparatus 201 may be configured as a MOPO system including the laser apparatus 1 serving as a master oscillator for generating seed light and a power oscillator 200 for amplifying the seed light output from the laser apparatus 1.

The configuration and the functions of the laser apparatus 1 in the fifth embodiment are the same as or similar to the configuration and the functions of the laser apparatus 1 in the fourth embodiment. The laser light output from the laser apparatus 1 may be guided to a partial reflection mirror (rear mirror) 73 of the power oscillator 200 via high reflection mirrors 71 and 72.

The power oscillator 200 may include a Fabry-Perot resonator for causing the laser light to travel back and forth between the partial reflection mirror (rear mirror) 73 and another partial reflection mirror (output coupler) 74. The power oscillator 200 may cause the laser light to travel back and forth and pass through the laser chamber 8, thereby amplifying the laser light. The configuration and the functions of the laser chamber 8 are the same as or similar to the configuration and the functions of the laser chamber 8 described in the fourth embodiment.

The laser light having been amplified by the power oscillator 200 may be output as output laser light via the partial reflection mirror (output coupler) 74. According to this embodiment as well, the power oscillator 200 may amplify the seed light even if the energy of the seed light has been changed to some extent due to the control of the spectral linewidth in the laser apparatus 1; therefore, the power oscillator 200 can output laser light in a stable manner.

The power oscillators in the embodiments described above may be replaced with a power amplifier, resulting in not a MOPO system but a master oscillator/power amplifier (MOPA) system.

What is claimed is:

1. A laser apparatus comprising:
   an excitation source configured to excite a laser medium in a laser gain space;
   an optical resonator including an output coupler arranged on one side of an optical path through the laser gain space and a wavelength dispersion element arranged on the other side of the optical path through the laser gain space;
   a beam-width change optical system configured to expand or reduce a beam width of incident light and emit light having an expanded or reduced beam width; and
   a switching mechanism configured to selectively place and remove the beam-width change optical system in and from an optical path between the laser gain space and the wavelength dispersion element.

2. The laser apparatus according to claim 1, further comprising a wavefront adjuster configured to change a wavefront of light traveling back and forth in the optical resonator.

3. The laser apparatus according to claim 2, wherein the beam-width change optical system includes a first beam-width change optical element having a first beam-width magnification or reduction factor and a second beam-width change optical element having a second beam-width magnification or reduction factor which is different from the first beam-width magnification or reduction factor, and
   the switching mechanism is configured to selectively place the first beam-width change optical element or the second beam-width change optical element in the optical path between the laser gain space and the wavelength dispersion element.

4. The laser apparatus according to claim 1, wherein the beam-width change optical system is an afocal optical system.

5. The laser apparatus according to claim 1, wherein the beam-width change optical system expands the beam width of incident light from the laser gain space and emits the resulting light toward the wavelength dispersion element.

6. The laser apparatus according to claim 1, wherein an optical axis of incident light entering the beam-width change optical system and an optical axis of light emitted from the beam-width change optical system are substantially parallel to each other.

7. The laser apparatus according to claim 1, wherein light entering the beam-width change optical system and light emitted from the beam-width change optical system have substantially the same optical axis.

8. The laser apparatus according to claim 1, wherein an optical axis of light entering the beam-width change optical system and an optical axis of light emitted from the beam-width change optical system form a particular refraction angle, and
the switching mechanism selectively places the beam-width change optical system and an optical element with which an optical axis of light incident thereon and an optical axis of light emitted therefrom form the particular refraction angle.

9. The laser apparatus according to claim 1, further comprising any one of a power oscillator and a power amplifier configured to amplify laser light output from the resonator.

10. The laser apparatus according to claim 1, the wavelength dispersion element includes a grating.

11. The laser apparatus according to claim 1, the beam-width change optical system includes a prism.

12. The laser apparatus according to claim 1, the beam-width change optical system includes a cylindrical concave minor and a cylindrical convex minor.

13. The laser apparatus according to claim 1, the beam-width change optical system includes a cylindrical concave lens and a cylindrical convex lens.

14. A laser apparatus comprising:
a laser chamber;
an excitation source configured to excite a laser medium in the laser chamber so as to generate light;
a window through which the light generated in the laser chamber is transmitted to an outside of the laser chamber;
a grating arranged so as to reflect the light transmitted from the laser chamber through the window;
a first prism; and
a switching mechanism configured to selectively place and remove the first prism in and from an optical path between the window and the grating.

15. The laser apparatus according to claim 14, further comprising a second prism, wherein the switching mechanism is configured to selectively place and remove the second prism in and from the optical path between the window and the grating, and
the switching mechanism is configured to remove the second prism from the optical path when placing the first prism in the optical path, and place the second prism in the optical path when removing the first prism in the optical path.

16. A laser apparatus comprising:
a laser chamber;
an excitation source configured to excite a laser medium in the laser chamber;
a wavelength dispersion element arranged so as to form an optical path between the laser chamber and the wavelength dispersion element and configured to disperse a wavelength of light transmitted along the optical path;
a beam-width change element configured to change a beam width of incident light;
a switching system configured to selectively place and remove the beam-width change element in and from the optical path between the excitation source and the wavelength dispersion element.

17. The laser apparatus according to claim 16, wherein the beam-width change element includes a first prism, and the switching system is configured to selectively place and remove the first prism in and from the optical path between the excitation source and the wavelength dispersion element.

18. The laser apparatus according to claim 16, further comprising a second prism, wherein the switching system is configured to selectively place the first prism or the second prism in the optical path between the excitation source and the wavelength dispersion element.

19. The laser apparatus according to claim 18, wherein the switching system is configured to remove the second prism from the optical path when placing the first prism in the optical path, and place the second prism in the optical path when removing the first prism in the optical path.

20. The laser apparatus according to claim 16, further comprising an output coupler arranged on a side opposite to the wavelength dispersion element with respect to the laser chamber so that the output coupler and the wavelength dispersion element constitutes an optical resonator.

* * * * *

UNITED STATES PATENT AND TRADEMARK OFFICE
CERTIFICATE OF CORRECTION

| | | |
|---|---|---|
| PATENT NO. | : 8,611,393 B2 | |
| APPLICATION NO. | : 13/421116 | |
| DATED | : December 17, 2013 | |
| INVENTOR(S) | : Junichi Fujimoto et al. | |

It is certified that error appears in the above-identified patent and that said Letters Patent is hereby corrected as shown below:

In the Claims

Please change claim 12, column 15, line 27 to read as follows:

~~minor~~ mirror and a cylindrical convex ~~minor~~ mirror.

Signed and Sealed this
Twenty-eighth Day of October, 2014

Michelle K. Lee
*Deputy Director of the United States Patent and Trademark Office*